US010864697B2

(12) United States Patent
Daton-Lovett

(10) Patent No.: US 10,864,697 B2
(45) Date of Patent: Dec. 15, 2020

(54) COMPOSITE MEMBERS AND METHODS OF MANUFACTURING SAME

(71) Applicant: RTL Materials Ltd., Lymington (GB)

(72) Inventor: Andrew Daton-Lovett, Lymington (GB)

(73) Assignee: RTL Materials Ltd., Lymington (GB)

( * ) Notice: Subject to any disclaimer, the term of this patent is extended or adjusted under 35 U.S.C. 154(b) by 116 days.

(21) Appl. No.: 15/756,323

(22) PCT Filed: Aug. 24, 2016

(86) PCT No.: PCT/GB2016/052629
§ 371 (c)(1),
(2) Date: Feb. 28, 2018

(87) PCT Pub. No.: WO2017/037424
PCT Pub. Date: Mar. 9, 2017

(65) Prior Publication Data
US 2018/0250906 A1    Sep. 6, 2018

(30) Foreign Application Priority Data

Aug. 28, 2015 (GB) .................................. 1515368.7

(51) Int. Cl.
*B32B 3/10* (2006.01)
*B32B 3/08* (2006.01)
(Continued)

(52) U.S. Cl.
CPC .................. *B32B 3/08* (2013.01); *B32B 1/08* (2013.01); *B32B 3/18* (2013.01); *B32B 5/02* (2013.01);
(Continued)

(58) Field of Classification Search
None
See application file for complete search history.

(56) References Cited

U.S. PATENT DOCUMENTS 6,256,938 B1 * 7/2001 Daton-Lovett ....... F16H 19/064
138/119
6,602,574 B1 * 8/2003 Daton-Lovett ....... B65H 75/34
428/105

FOREIGN PATENT DOCUMENTS

| WO | 88/08620 A1 | 11/1988 |
| WO | 00/64663 A2 | 11/2000 |
| WO | 2013/039809 A1 | 3/2013 |

OTHER PUBLICATIONS

International Search Report dated Oct. 19, 2016 in corresponding International Patent Application No. PCT/GB2016/052629.
(Continued)

*Primary Examiner* — Christopher M Polley
(74) *Attorney, Agent, or Firm* — Troutman Pepper Hamilton Sanders LLP

(57) ABSTRACT

The present application relates to composite members and to methods of manufacturing a composite member. In an aspect, a composite member (10) is formed as a longitudinal structure capable of being coiled about an axis transverse to the longitudinal axis of the member. The composite member (10) comprising plural layers (p1-p5) of material bonded together to form a laminate. At least one layer (p3) of material has a boundary (30) partway along the longitudinal extent of the member and extending between the sides of the member. The boundary (30) is angled with respect to the transverse axis (18) of the member.

20 Claims, 10 Drawing Sheets

(51) Int. Cl.
- *B32B 27/36* (2006.01)
- *B32B 5/02* (2006.01)
- *B32B 1/08* (2006.01)
- *B32B 27/30* (2006.01)
- *B32B 5/14* (2006.01)
- *B32B 27/38* (2006.01)
- *B32B 27/08* (2006.01)
- *B32B 3/18* (2006.01)

(52) U.S. Cl.
CPC .............. *B32B 5/024* (2013.01); *B32B 5/026* (2013.01); *B32B 5/142* (2013.01); *B32B 27/08* (2013.01); *B32B 27/306* (2013.01); *B32B 27/36* (2013.01); *B32B 27/38* (2013.01); *B32B 2260/021* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2307/514* (2013.01); *B32B 2307/546* (2013.01); *B32B 2597/00* (2013.01)

(56) References Cited

OTHER PUBLICATIONS

British Search Report dated Oct. 14, 2015 in corresponding British Patent Application No. GB1515368.7.

\* cited by examiner

COMPOSITE MEMBERS AND METHODS OF MANUFACTURING SAME

This application is a national phase filing under 35 U.S.C. § 371 of International Patent Application No. PCT/GB2016/052629, filed Aug. 24, 2016, which claims the benefit of British Patent Application No. 1515368.7, filed Aug. 28, 2015, each of which is incorporated herein by reference in its entirety.

The present invention relates to composite members and to methods of manufacturing a composite member.

Composite materials are derived by combining two or more individual materials with intent of achieving superior properties over the components. Composites can generally be said to be materials that contain reinforcement (such as fibres or particles) supported by binder (matrix). Laminar composites are made up of more than one layer (lamina) arranged with their main reinforcement orientated in at least two different directions. The manufacture of composite structures generally involves placing the components in correct alignment to each other to achieve the desired material properties and forming the components into a whole.

Fibre-reinforced composites used in most high-performance applications are laminated with layers of continuous unidirectional fibres at discrete angles to one another, thereby distributing the in-plane load in several directions. Layers with woven or braided fibres can also be used where the fibres in a layer have more than one orientation. A variety of fibre placement processes are used to achieve the desired combination of orientations. Some type of cure or moulding process follows the fibre placement process to set the product. Various manufacturing techniques are used depending on suitability to the type of part that is being manufactured.

It is known to manufacture extendable members comprising composite laminates, where the member can be wound into a coiled state, e.g. for storage, transportation, etc., and can be unwound into extended state for deployment. This transformation is often reversible such that the member can undergo may cycles between the coiled state and extended state. This presents challenges in the manufacture of such items in controlling the placement and positioning of the layers of material to give rise to the desired properties in the member whilst being able to withstand the stresses placed on the member by the process of coiling/extending which may act to damage the structure of the composite and so shorten its lifespan.

The techniques disclosed herein aim to address these and other problems.

According to a first aspect of the present invention, there is provided a composite member formed as a longitudinal structure capable of being coiled about an axis transverse to the longitudinal axis of the member, the composite member comprising plural layers of material bonded together to form a laminate, wherein at least one layer of material has a boundary partway along the longitudinal extent of the member and extending between the sides of the member, wherein the boundary is angled with respect to the transverse axis of the member.

At least one "partial" layer does not extend all the length of the member, which allows the properties of the member to be tailored along its length according to the application. The angled boundary of that layer means that stresses and strains experience by the member during coiling and extension are less concentrated in one location and so the member is protected from damage and premature failure. The partial layer is preferably an interior layer of the laminate. Preferably at least one layer of the laminate is a continuous layer in that it extends the complete length of the member. At least the surface layers may be continuous with at least one partial interior layer.

In embodiments, the member is partially or fully tubular meaning that is having cross section ranging from curved to substantially closed tube or tube with overlapping edges, subtending any suitable angle and including the possibility of straight edges within overall general curvature. Thus, the member may form a slit hollow section when extended that can be opened out at the longitudinal edges and flattened to be coiled.

In embodiments, one or more layers comprise a fibre reinforced composite, for example a fibre reinforced polymer. Layers may have single directional ply, 2 dimensional plies such as woven or knitted fabrics, or 3 dimensional plies having links between the laminae.

In embodiments, the member is constructed and arranged so as to be bistable. Thus, the structure has a stable form in the extended form as well as in its coiled form. Such bistable reeled composites as they are known benefit particularly from the novel techniques disclosed herein due to the increased strains experienced by the structure and particularly when a section "flips" from one form to the other. These high strains are concentrated by a discontinuity in the structure, which can lead to rapid failure of the member, e.g. by cracking or delamination. By providing an angled boundary for a layer, a bistable member can be produced where the properties can be changed along its length by changing the structure, without the member prematurely failing due to the action of smoothing out the possible stress concentration at the boundary of the layer.

The layer boundary may comprise a V-shape or inverted V-shape. The layer boundary may comprise a U-shape or inverted U-shape. The depth of the V- or U-shape is preferably at least 50% of the flattened width of the member and may be 100% of the width or more.

The layer boundary may comprise a zig-zag shape having plural points or a curved shape having at least one maxima and at least one minima.

In an embodiment, a first layer has a boundary partway long the member and a second layer within the same laminar plane as the first layer and has a boundary that matches the boundary of the first member such that the first and second layers are contiguous in a longitudinal direction. In this way, the overall thickness of the member may be kept constant, but the local properties of the member may still be altered by choosing adjoining layers with different properties, e.g. number and orientation of fibres.

In an embodiment, at least one layer having a boundary is provided at a central longitudinal portion of the member and does not extend to at least one end of the member, the at least one layer providing additional bending stiffness to the member at the central portion but not the at least one end portion so as to require less force to initiate coiling of the member at that end. This is useful where the member is used as a mast, boom or other load bearing structure, where greater stiffness is provided at the central portion of the member where the bending stresses are greatest. However, a lower stiffness can be achieved at the end or ends so that the amount of force needed to initiate coiling of the member is reduced. For example, the fibres in the layer are aligned substantially longitudinally to provide greater bending stiffness.

In an embodiment, coiling is initiated at a first end of the member, wherein at least one layer having a boundary is provided at the opposite end of the member, the at least one layer providing additional bending stiffness to the member so as to increase the natural diameter of the coil. This can help reduce residual stresses and strains in the member when coiled by providing a member where the natural diameter of the coil changes along the length of the member in accordance with the increasing diameter of the coils as the member is progressively coiled. For example, the fibres in the layer are aligned substantially longitudinally to provide greater bending stiffness.

It will be appreciated that the layer or layers having the boundary partway along the member can be chosen according to the application. For instance, the layer may have reinforcing fibres orientated transversely to the axis of the member to increase hoop stiffness locally. Other layers may be provided to tailor the bistability of the member locally.

In an embodiment, the member comprises plural layers having respective plural boundaries wherein the boundaries are offset along member so as to create gradual increase in stiffness and/or coil diameter along at least a portion of the member.

In an embodiment, the at least one layer is a braided or woven fibre reinforced layer, wherein the fibres local to the boundary are combed out so as to reduce the amount of intermeshing of the fibres and to align the fibre ends increasingly with the longitudinal axis so as to provide strain relief at the boundary when coiling or extending the member.

In an embodiment, a first layer has a boundary partway long the member and a second layer within the same laminar plane as the first layer and has a boundary that matches the boundary of the first member such that the first and second layers are contiguous in a longitudinal direction, wherein both first and second layers are braided or woven fibre reinforced layers having their fibres local to their respective boundaries combed out and intermingled with each other.

In an embodiment, a mast or boom is provided comprising a composite member as described above.

According to a second aspect of the present invention, there is provided a method of manufacturing a composite member, the composite member being formed as a longitudinal structure capable of being coiled about an axis transverse to the longitudinal axis of the member, the method comprising:

stacking plural layers of material, wherein at least one layer of material has a boundary partway along the longitudinal extent of the member and extending between the sides of the member, wherein the boundary is angled with respect to the transverse axis of the member.

bonding the layers of material to form a laminate.

In an embodiment the at least one layer is a braided or woven fibre reinforced layer, the method comprising, prior to bonding the layers of material, combing out the fibres local to the boundary so as to reduce the amount of intermeshing of the fibres and to align the fibre ends increasingly with the longitudinal axis so as to provide strain relief at the boundary when coiling or extending the member.

In an embodiment stacking the plural layers comprises placing a first layer of material having a boundary partway long the member and placing a second layer of material within the same laminar plane as the first layer and has a boundary that matches the boundary of the first member such that the first and second layers are contiguous in a longitudinal direction, wherein both first and second layers are braided or woven fibre reinforced layers and the method further comprises combing out the fibres of the first and second layers local to their respective boundaries and intermingled the combed out fibres with each other.

According to a third aspect of the present invention, there is provided a composite member formed as a longitudinal structure capable of being coiled about an axis transverse to the longitudinal axis of the member, the composite member comprising plural layers of material bonded together to form a laminate, wherein at least one layer of material is a braided or woven fibre reinforced layer and has a boundary partway along the longitudinal extent of the member and extending between the sides of the member, wherein the fibres local to the boundary are combed out so as to reduce the amount of intermeshing of the fibres and to align the fibre ends increasingly with the longitudinal axis so as to provide strain relief at the boundary when coiling or extending the member.

In an embodiment a first layer has a boundary partway long the member and a second layer within the same laminar plane as the first layer and has a boundary that matches the boundary of the first member such that the first and second layers are contiguous in a longitudinal direction, wherein both first and second layers are braided or woven fibre reinforced layers having their fibres local to their respective boundaries combed out and intermingled with each other.

According to a third aspect of the present invention, there is provided a method of manufacturing a composite member, the composite member being formed as a longitudinal structure capable of being coiled about an axis transverse to the longitudinal axis of the member, the method comprising:

stacking plural layers of material, wherein at least one layer of material is a braided or woven fibre reinforced layer and has a boundary partway along the longitudinal extent of the member and extending between the sides of the member;

combing out the fibres local to the boundary so as to reduce the amount of intermeshing of the fibres and to align the fibre ends increasingly with the longitudinal axis; and bonding the layers of material to form a laminate.

In an embodiment, stacking the plural layers comprises placing a first layer of material having a boundary partway long the member and placing a second layer of material within the same laminar plane as the first layer and has a boundary that matches the boundary of the first member such that the first and second layers are contiguous in a longitudinal direction, wherein both first and second layers are braided or woven fibre reinforced layers and the method further comprises combing out the fibres of the first and second layers local to their respective boundaries and intermingled the combed out fibres with each other.

It will be appreciated that any features expressed herein as being provided "in one example" or "in an embodiment" or as being "preferable" may be provided in combination with any one or more other such features together with any one or more of the aspects of the present invention.

Embodiments of the present invention will now be described by way of example with reference to the accompanying drawings, in which.

Figure 1:
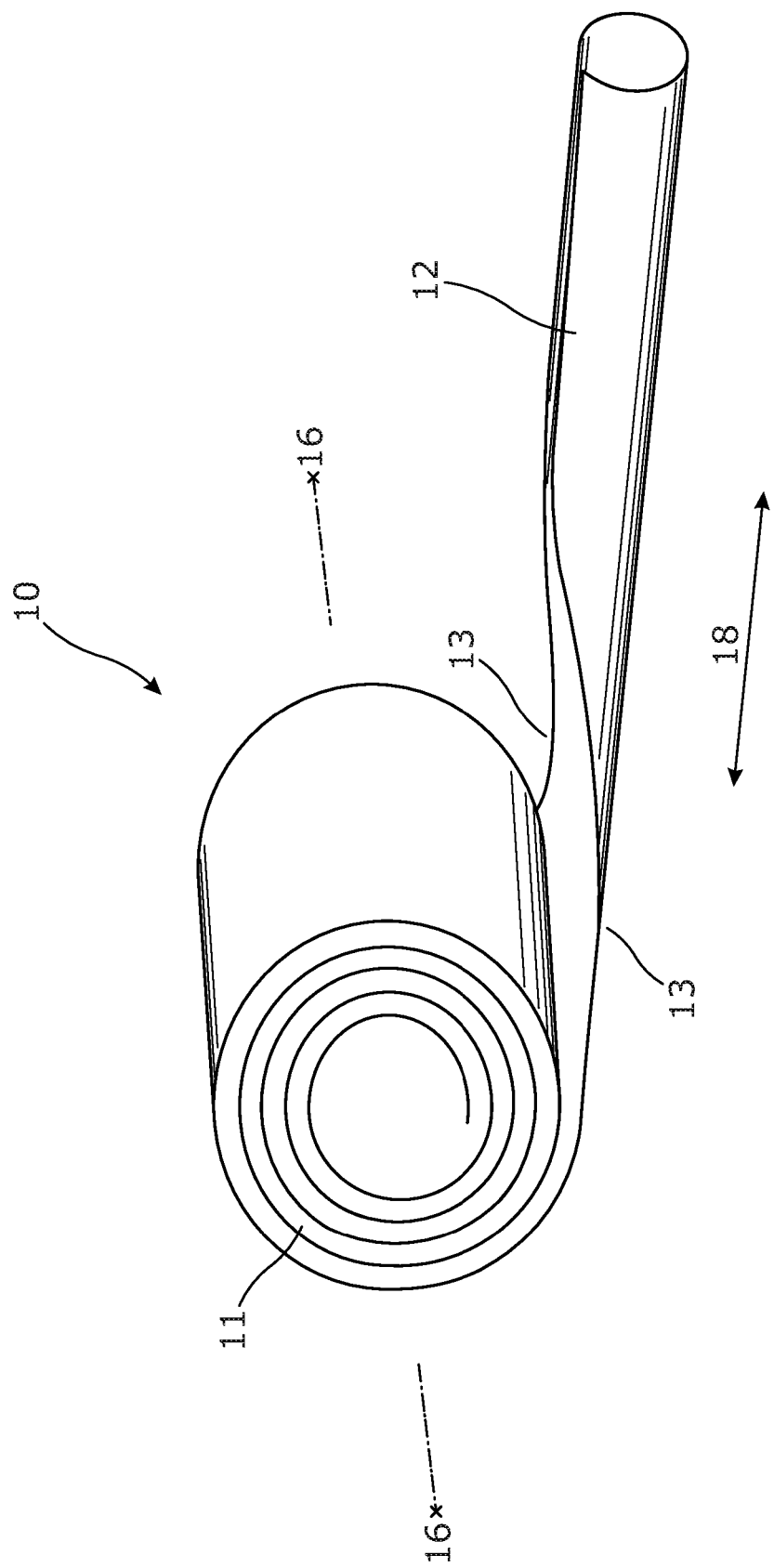
FIG. 1 shows an example of an extendible member comprising a composite laminate material.

FIG. 1 shows an example of an extendible member 10 comprising a composite laminate material. The member 10 can be reversibly reconfigured between a coiled state 11 and an extended state 12. In the extended state 12 the member is generally elongated and biased to have a curved or non-linear cross section in a direction transverse to the longitudinal axis 18 of the member. (References to longitudinal axis or longitudinal extent or direction of extension in this document generally refer to this axis 18). Typically the longitudinal extend of the member 10 is several times the transverse width of the member, e.g. 5 times or 10 times or more. This curvature can be adapted and thus the cross section of the extended portion can comprise anything from a closed or substantially closed circular shape as in the present example to a shallow arc. This gives structural rigidity to the member 10 when extended. In the coiled state 11 the member 10 is generally opened out at the side edges 13 to have a flat cross section, and is coiled around an axis 16 that is transverse to the longitudinal axis 18 of the member 10. The member 10 is thin in cross section to aid coiling, e.g. typically between 0.5 mm and 5 mm for most applications. Preferably, the member 2 is capable of reversible configuration between its coiled and extended forms a plurality of times.

As described, the member 2 shown in FIG. 1 provides a slit tubular structure, generically known as a STEM (slit tubular extendable members), which have been used since the 1950's as an alternative to telescopic or jointed devices to provide for extendable members from a small initial envelope. The slit tube can be opened along the slit line formed by the side edges 13 and coiled for compact storage or driven between the coiled and extended forms to provide a driven arm, mast or boom.

In the present example, the laminar composite has fibre reinforcements, preferably being a fibre reinforced polymer ("FRP" hereafter). FRPs are known per se and are not described in detail herein. However, in brief, FRPs are composite materials made of a polymer matrix reinforced with continuous fibres. The fibres are usually fiberglass, carbon, or aramid, while the polymer is usually an epoxy, vinylester or polyester thermosetting plastic. The use of fibrous materials mechanically enhances the strength and elasticity of the plastics. The original plastic material without fibre reinforcement is known as the matrix. The matrix is a tough but relatively weak plastic that is reinforced by stronger stiffer reinforcing filaments or fibres. The extent that strength and elasticity are enhanced in a fibre reinforced plastic depends on the mechanical properties of both the fibre and the matrix, their volume relative to one another, and the fibre length and orientation within the matrix.

The use of FRP allows the mechanical characteristics of the member 10 to be manipulated by varying the weight and direction of fibres in the various layers in such a manner as to produce something that can be tailored to the needs of a specific application. For example, this allows fine tuning of axial/torsional/hoop stiffness to be achieved by, for example, changing the angles and fibre content of the layers.

The layers in the laminar composite may have the fibres run parallel in a particular direction. In others the fibres that are interwoven in some manner, the most common being weaving or braiding the fibres, although knitted fabrics and fabrics that are made from laminar fibres that are linked through the lamina plane by a separate "knot" of fibre are also used.

The composite is then formed by placing laminar of either or both of these types of material one on top of the other, e.g. shaped as a flat plate or a curved shell, and arranging for the resulting stack of fibre materials to be impregnated with a resin, referred to as the matrix, bonding the fibres to form a contiguous solid. Each of these layers is referred to as a ply (or lamina). The sequence of plies is referred to as a lay-up.

In the present example, the member 10 is a bistable reelable composite (BRC). Such a bistable member has a first stable state in the coiled form 11, where the cross section of the member 10 is generally flat and a second stable state in the extended form 12, where the cross section of the member is curved as previously described. Preferably, the bistable member 10 is capable of reversible configuration between its coiled and extended forms a plurality of times. Suitable structures are disclosed in the following international patent applications, each of which is incorporated here by reference: WO-A-88/08620, WO-A-97/35706, WO-A-99/62811, and WO-A-99/62812. Such bistable structures are available from RolaTube Technology Limited of Lymington, United Kingdom.

In brief, BRCs are preferably made from laminated, fibre-reinforced composites. The basic mechanism involved to provide bistability uses the fact that as a curved shell is straightened the inner surface gets longer and the outer surface gets shorter. The surface layers of the BRC, i.e. those offset from the midplane, have fibre reinforcements which are orientated at an angle to the longitudinal axis of the tube. These surface fibres are deformed as the initial curvature of the tube is straightened when opening the tube at the slit. As a result of this deformation a force is exerted which causes the opened section to curve into the second, coiled form. In engineering terms these surface layers have high Poisson's ratios.

Normally when something is bent the amount of energy stored by that bending (the total strain energy) rises as the bend increases. In BRCs, once the initial curvature is straightened as the tube is opened, the stiffness along the longitudinal axis drops and the forces acting on the material of the tube arising by the deformed surface fibres can act to flip it into the coiled form. As this second curve forms, the total strain energy drops, thereby forming a second stable form for this section.

These manage the problems of difficult handling and complicated mechanisms by forming STEM type structures from materials that have been engineered so as to make them easy to coil and handle, in particular many of them exhibit a stable geometry in both the extended and coiled states.

When designing an extendable member 10, whether bistable or not, a combination of the component materials can be chosen to optimise the various characteristics according to the application, i.e. rolling characteristics: degree of bi-stability, rolling load; and static characteristics when extended: stiffness, strength, harmonics, etc. In some cases, the component materials of the structure change along its length, allowing these characteristics to be modified locally.

Figure 2:
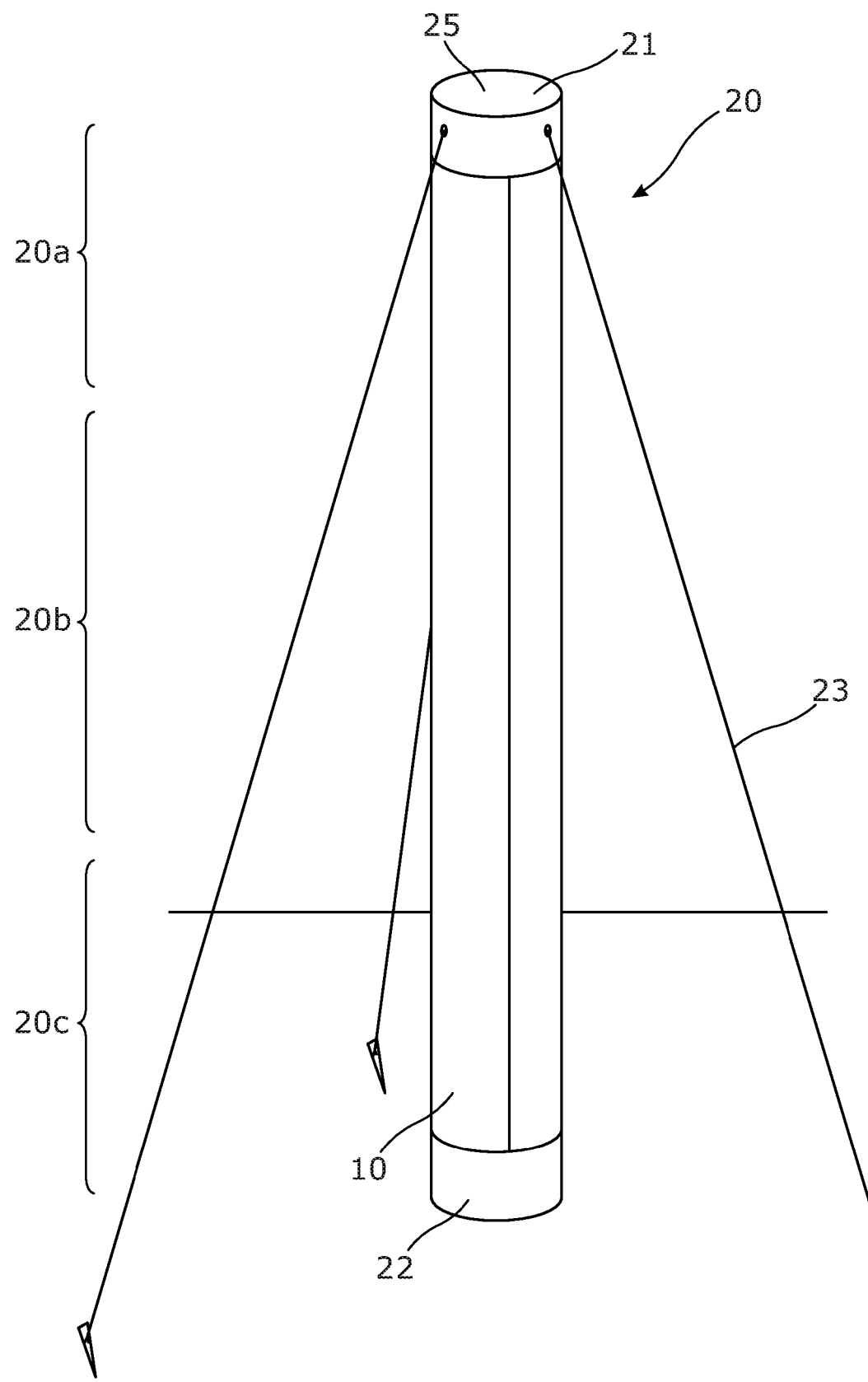
FIG. 2 shows an example of a mast comprising an extendible member.

FIG. 2 shows an example of a mast 20 formed from an extendable member 10 that is intended to support a load 25. In this example, the mast also comprises end caps 21,22 to hold the ends of the extendable member 10 and guy ropes 23 to hold the mast upright. The mast 20 needs to be stiff and strong enough to hold the top load 25 up but it should also preferable be easy to roll, e.g. so it can be rolled by hand.

In order to achieve a good compromise between these aims, one of the layers of the laminar composite, in this example one that has its reinforcement lying along the axis to provide bending stiffness to the member, is provided only at the centre portion 20b of the member 10, leaving the centre 20b stiffer, whereas the end portions 20a, 20c do not have this layer, thereby reducing its rolling load.

Figure 3:
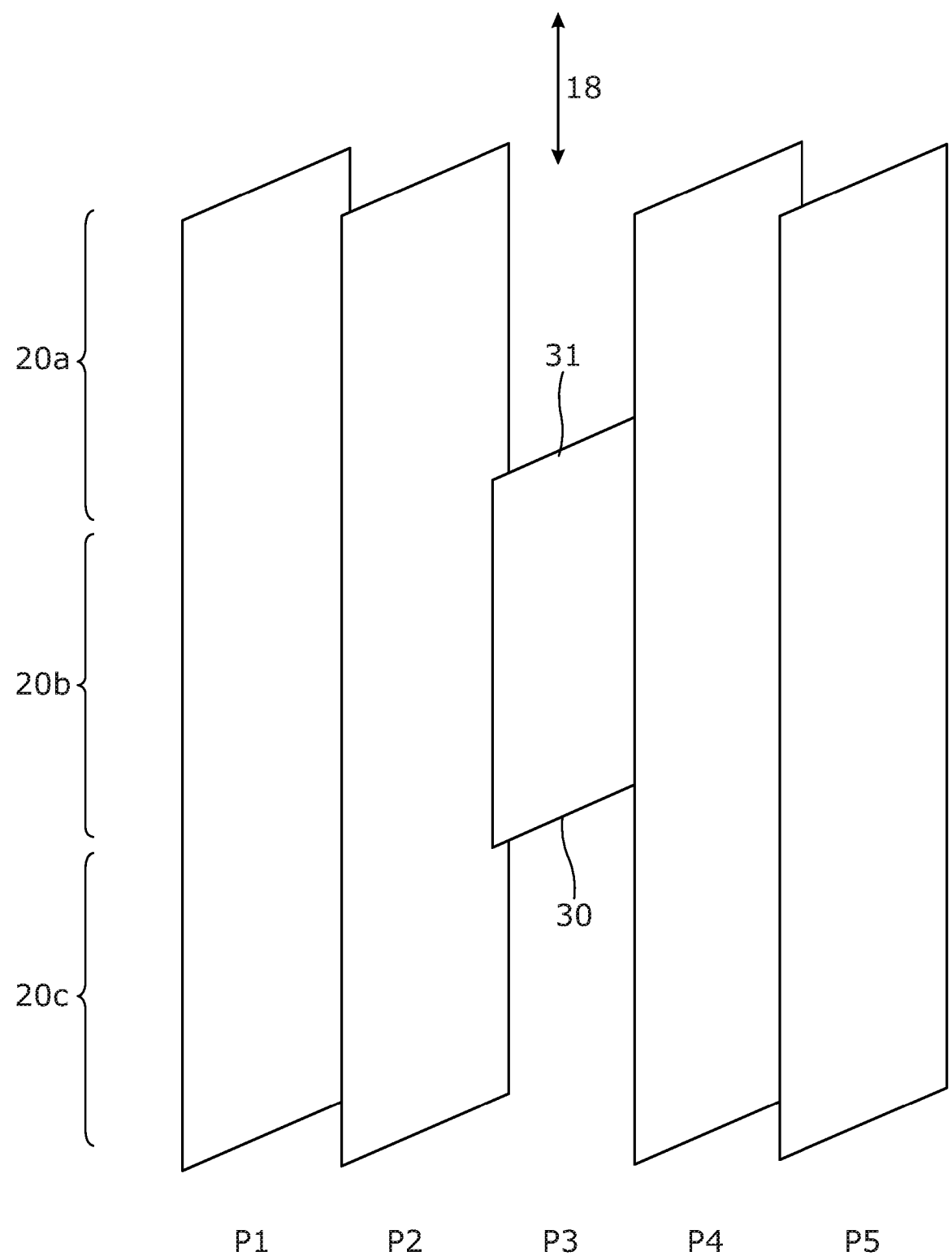
FIG. 3 shows an exploded view of the layers of a composite member.

The exploded diagram of FIG. 3 shows the layers of the mast 20 in more detail (the layers being shown in a flattened form for clarity). The overall bistable member 10 of the mast 20 is made up from 5 layers P1 to P5. The layers P1, P2, P4 and P5 extend along the entire longitudinal extent 18 of the member 10. Layers P1 and P5 have angled fibres to primarily provide the bistable nature of the member 10. Layers P2 and P3 have fibres that extend transversely and longitudinally respectively to provide bending stiffness and hoop stiffness respectively. The inner layer P3 also has longitudinal fibres and is selectively provided in the centre portion 20b of the mast 20 to provide the desired loading profile of a mast, i.e. highest in the middle 20b where the bending forces are highest, and lower at the ends 20a,20c to aid in initiating the coiling/uncoiling action. Thus, within the laminate, layer P3 has boundaries 30, 31 where it discontinues along the length of the member 2.

So, in the notation of laminates, the lay has a stacking order of [±45, 90, 0, 0, ±45] in the longitudinally central portion 20b of the member and a stacking order of [±45, 90, 0, ±45] at the end portions 20a,20c. (This notation signifies that the laminae successively have fibres orientated at these angles relative to the longitudinal axis.) The ±45° outer layers provide the bistability to the member, whereas the 90° ply provides hoop stiffness and the 0° ply provides longitudinal bending stiffness.

These layers may be made from pre-impregnated layers of Glass/Polypropylene. It will be appreciated that the mast 20 may have additional layers not shown here for simplicity. The mast 20 may have additional surface layers to provide abrasion resistance, strength, weather proofing, etc. For instance, the mast 20 may have an outer layer of polypropylene film and a layer of braided glass that is applied as a tubular sock. All these layers may be put together as a flat assembly, then heated under pressure to form the finished mast 20.

A STEM has to go through what may be a very large number of cycles of severe strain as it is coiled and extended. Discontinuities in the laminar structure can act to concentrate stress and strains which will lead to premature failure.

Figure 4:
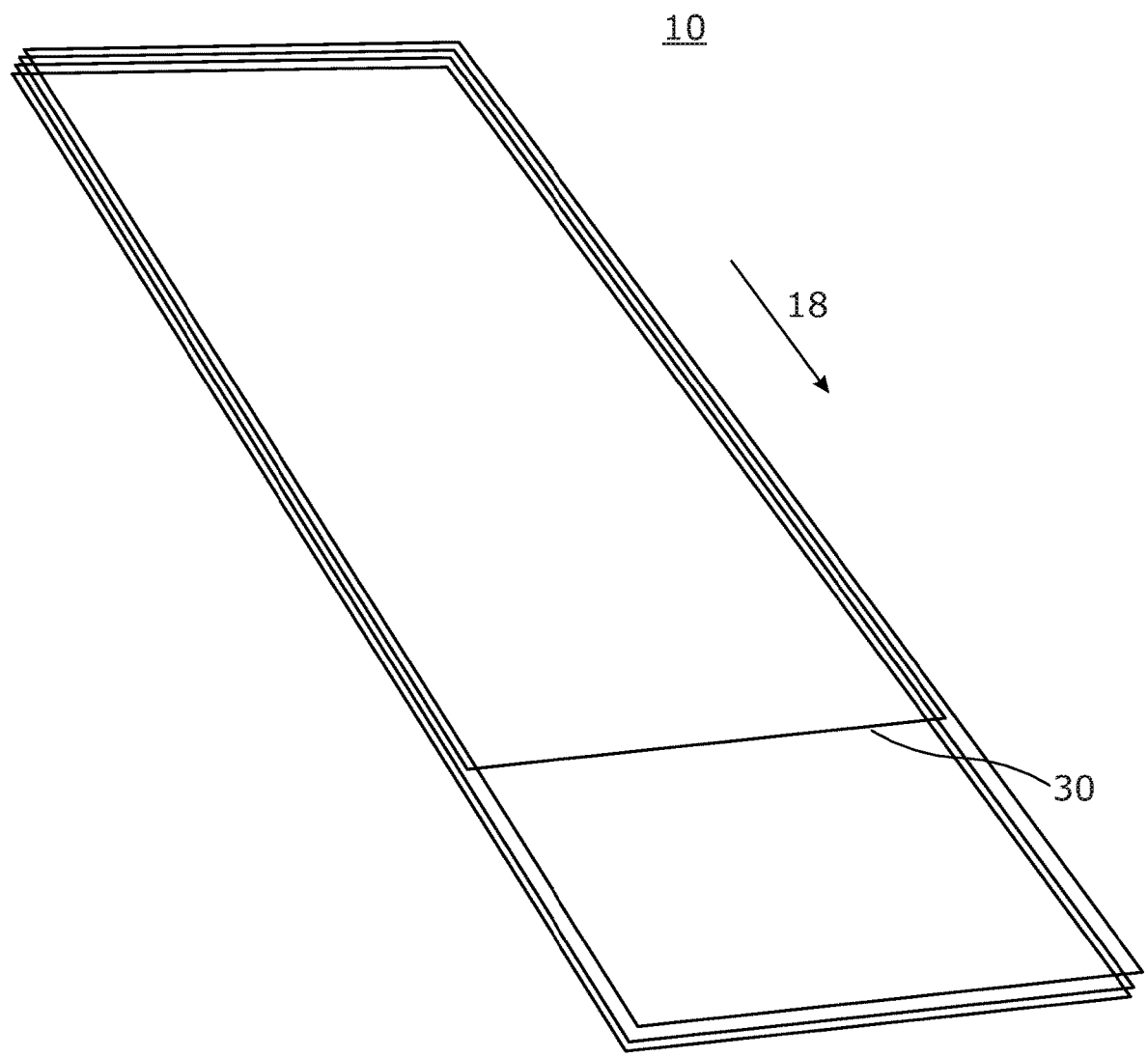
FIG. 4 shows a possible edge of a localised layer of a composite member.

FIG. 4 shows a possible layer boundary within the laminar structure of the member 10, which might be for example one of the boundaries 30,31 of the layer P3 in the example of FIG. 3. In this example, the boundary edge 30 is straight across the member 10 perpendicular to the longitudinal axis 18 of the member. This arrangement creates in very high stress concentrations, particularly at the side edges of the member 10 and will either fail the member 10 immediately or drastically reduce its cycle life. In particular, this can lead to fibre breakage, matrix cracking and/or delamination of the structure.

Figure 5:
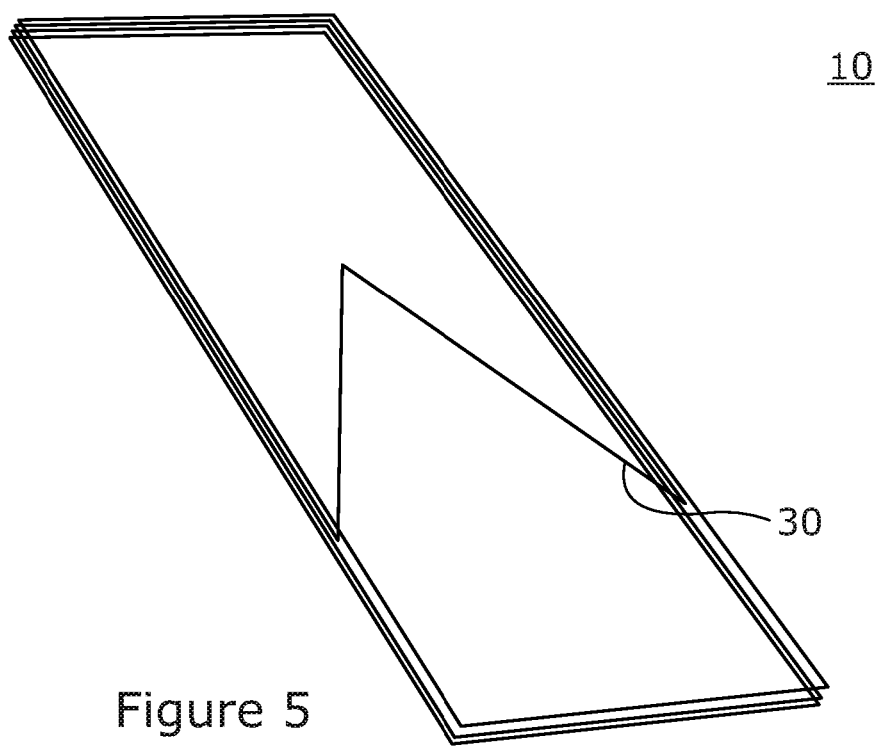
FIGS. 5 to 10 show example of the shape of an edge of a localised layer of a composite member.

FIG. 5 shows a preferred boundary where the edge 30 of the discontinuous layer forms a deep V. This has the beneficial effect of reducing the strains imposed by rolling by a very significant amount by making the transition gradual as the member 10 is rolled into its coiled form 11. The change in rolling loads is also gradual making it easier for the person rolling it than a sharp change in load would.

Figure 6:
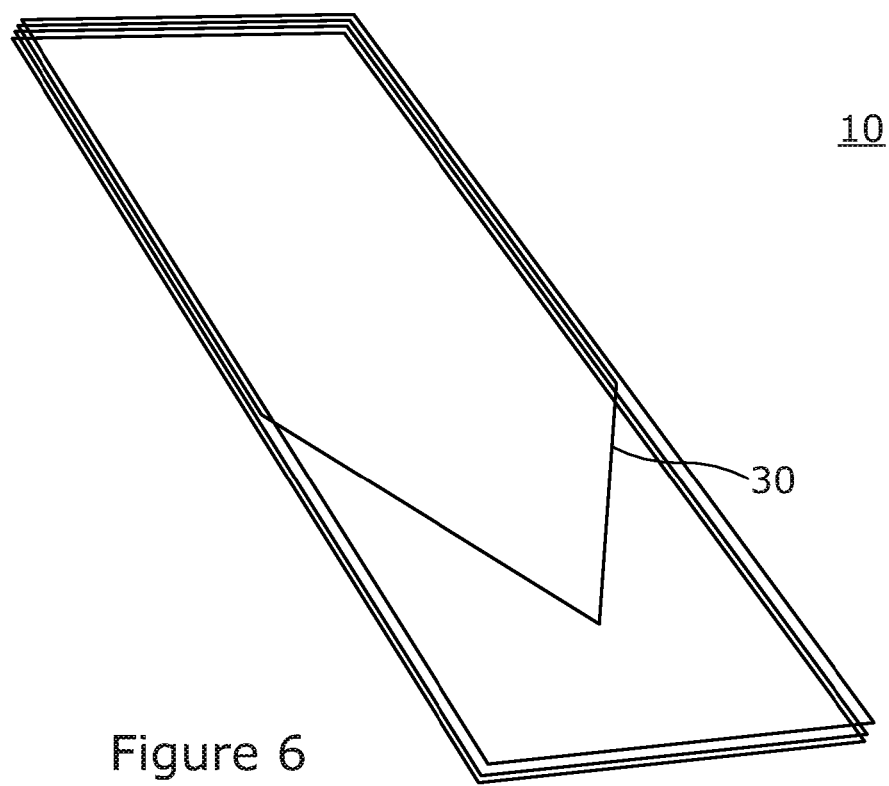

This example shows a cut-in V boundary edge 30. A range of other boundary designs are also useful. Reversing the form to a V boundary edge that has a protruding point, as shown in FIG. 6, has advantages in some situations. Whilst no good mathematical model currently exists, it is known from experience that as the diameter of the extended BRC gets larger relative to the thickness of the wall, the inverted V tends to offer better stability in rolling, whereas for smaller diameters relative to the wall thickness, the opposite tends to be true.

Figure 7:
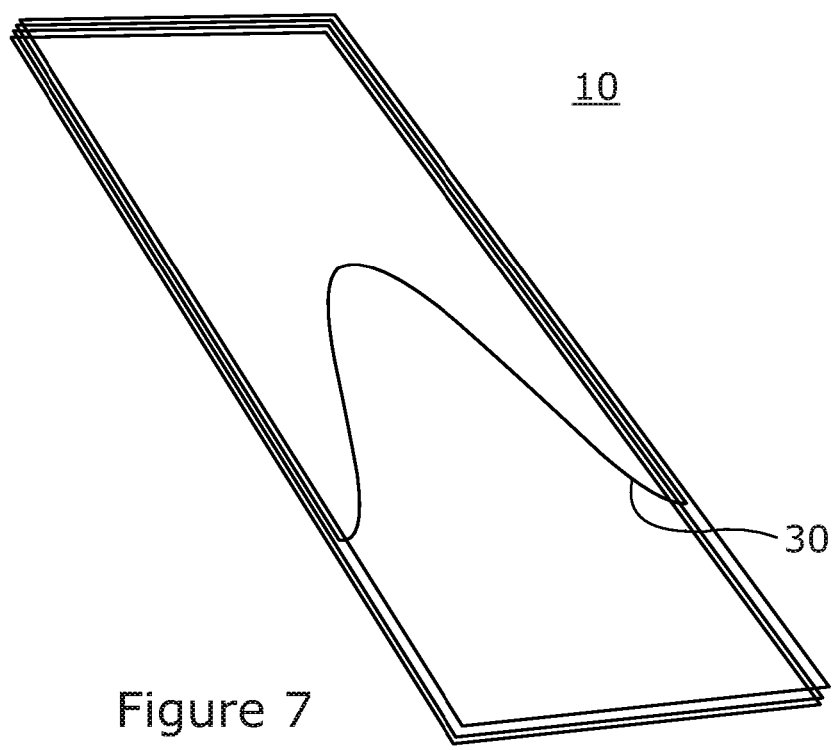
Figure 8:
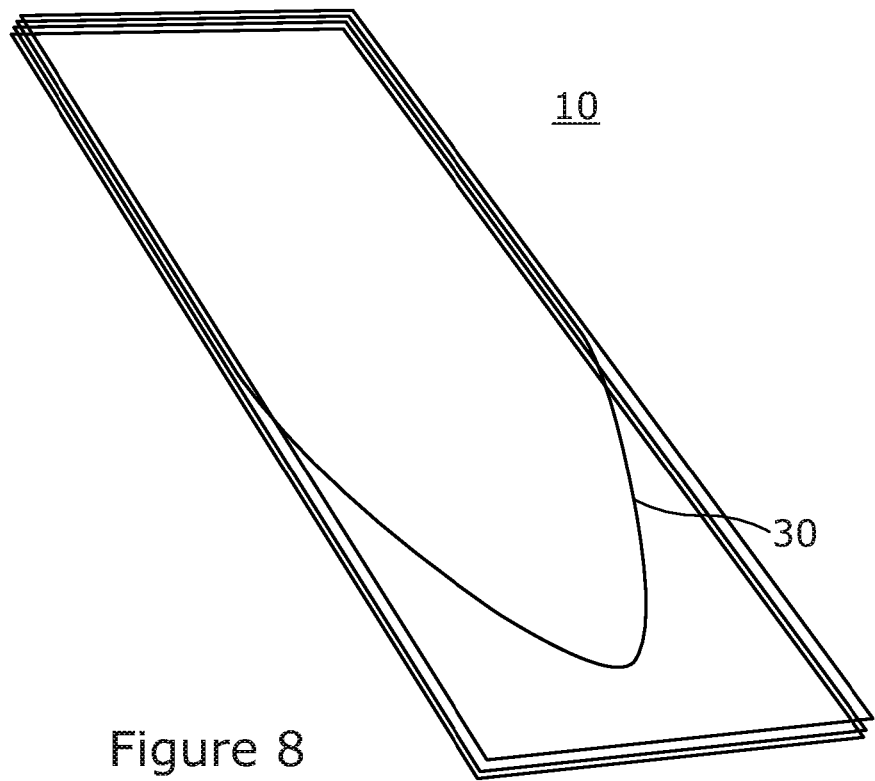

In addition to these pointed models for strain reduction there are a number of further variations having further advantages. In the example of FIG. 7, the cut-in V is modified by curving smoothly along the edge to form cut-in U boundary edge 30. Similarly, as shown in FIG. 8, the protruding point can be modified by smoothing to form a protruding U boundary edge 30.

Preferably the depth of the V or U in these examples is at least 50% of the transverse width of the member when flat, or in some applications may be more than 100% of the transverse width or more.

Figure 9:
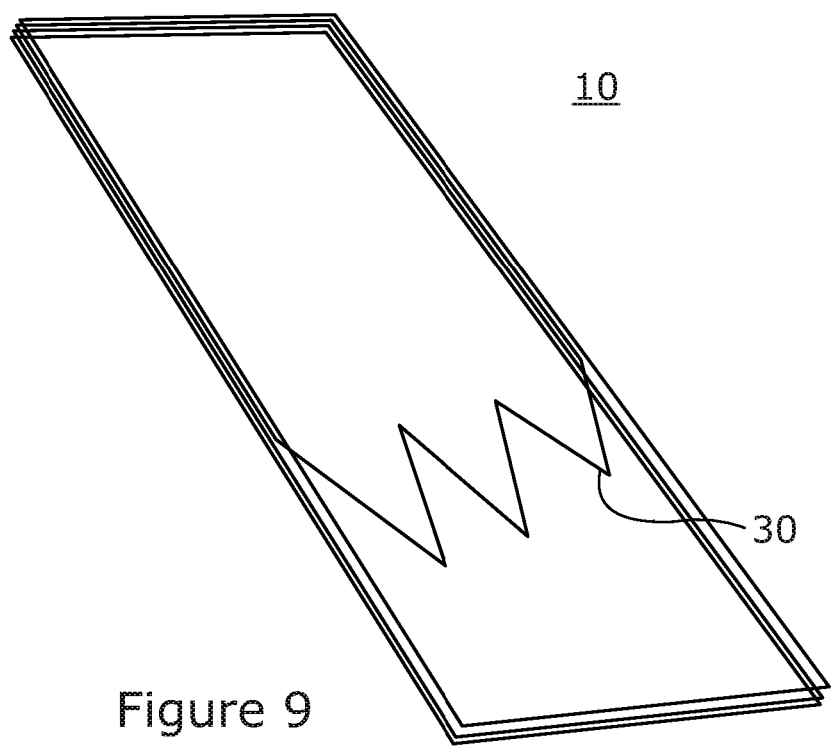
Figure 10:
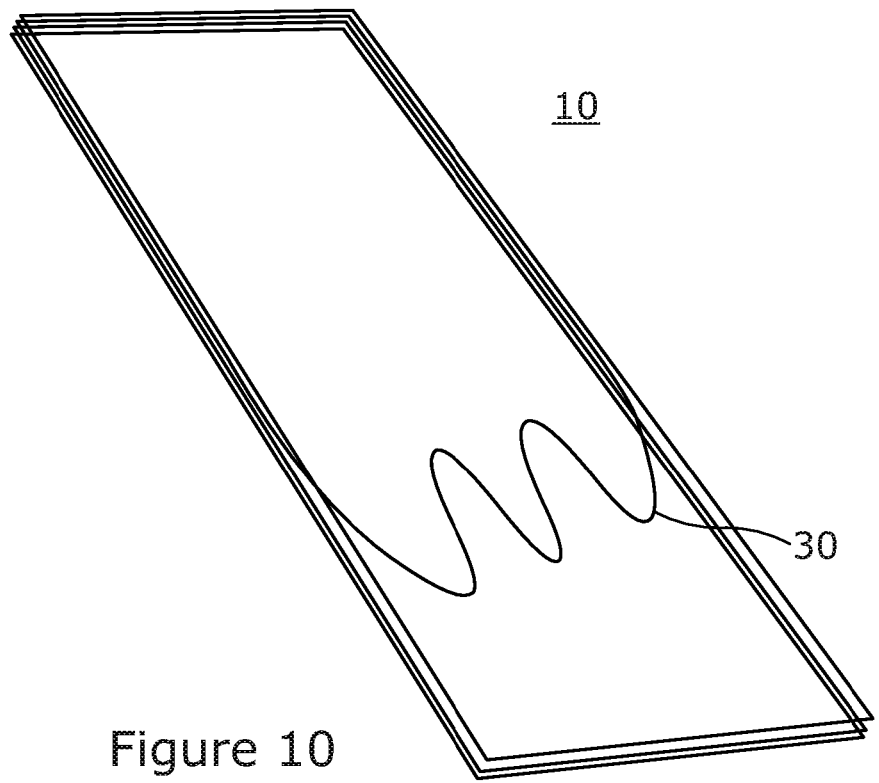

In other examples, the boundary profile may form repeated points forming a zigzag boundary edge 30, as shown in FIG. 9. The zigzag boundary can be smoothed to form a repeated curved boundary 30, as shown in FIG. 10.

As can be seen, various edge 30 shapes are possible. Each of these provides a gradual transition at the boundary of the layer relative to the member's axis of coiling such that the change in stress/strain when coiling the member caused by the transition is more gradually experienced by the member. These techniques can be used both when terminating a layer as in the examples of FIGS. 4 to 10, or as the boundary between two materials of a different nature for pre-impregnated or laminar materials. For instance, one layer can have a cut in V-shape boundary and the adjacent layer can have a corresponding cut-out V-shape boundary where the edges meet.

Figure 11:
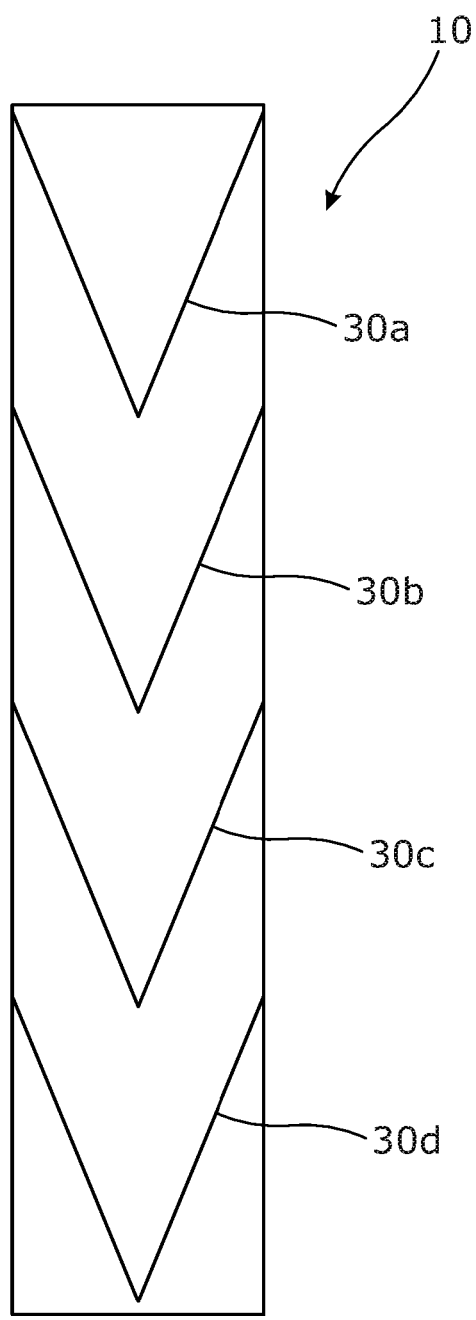
FIG. 11 shows boundary layers in another example of an extendible member.

Referring again to FIG. 2, in addition to (or as an alternative to) providing a mast 20 which is easy to get started rolling but stiff in operation, these techniques can be used to provide a mast 20 or any extendible member, whether bistable or not, in which it is possible to reduce strains in the coil 11 by reducing or increasing the natural secondary diameter of the coiled member 11 at different positions along its length to make it closer to the actual diameter of the coil 11. As will be appreciated, if the properties of the member 10 were identical along its length, then the member 10 would naturally tend to form a coil 11 with the same diameter throughout. However, in practice, the diameter of the coil 11 is forced to increase as the member 10 is progressively coiled and the coil 11 grows in size. This means that some portions have increased strain when coiled as a result of not being able to assume their natural coil diameter. To change the natural coiling diameter along the length of the member 10, the techniques described above can be used to provide increased stiffness locally in the member 10 by including additional layers or portions of layers with different properties along the length of the member 10. The coiling diameter can be changed locally by controlling the stiffness of axial layers and the angle and tensile strength of any cross ply layers or any combination thereof. The boundaries 30 of these layers are furthermore arranged using any of the novel techniques described herein so as to form a gradual boundary and reduce strains in the member 10. In this way, the stiffness can be controlled along the length of the member 10 so that the natural radius of the coil the member wants to adopt closer matches the radius of coil it actually form. In this way, residual strains in the member when coiled or in the process of being coiled are reduced. FIG. 11 shows (fully extended and flattened for clarity) an extendable member having plural transitions between layers of material where the layers of material are selected to provide natural coiling diameter that changes along the length of the member to correspond to the actual coiling diameter and where the boundaries are a V-shape to achieve a smooth transition and reduce stresses and strains on the structure when coiling and extending the member.

Figure 12:
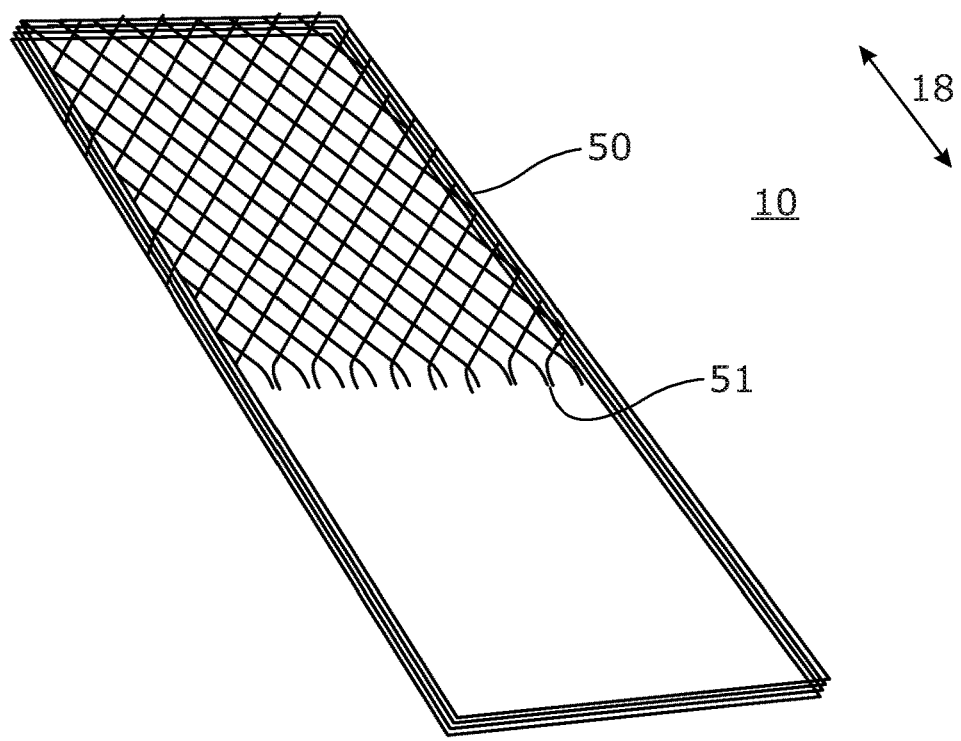
FIG. 12 shows an example of the arrangement of fibres at an edge of a layer of a composite member.

When forming an internal boundary in a laminate with woven or braided materials in a practical sense it is difficult to cut simple lines, particularly in braided materials that have a tendency to curl at the edges. FIG. 12 shows an example of a member 10 in which this tendency is compensated for by combing out the fibre ends of a woven or braided layer 50 such that, local to the edge 51, the fibres are not intertwined or are more loosely intertwined, and the fibres are orientated closer towards the longitudinal axis of the member compared with the predominate arrangement of the fibres in the main part of the woven or braided material. This provides a more gradual transition at the boundary 30 of the braided layer within the laminate and can therefore help avoid sharp spikes in the strain experienced when rolling the member 10. As shown in FIG. 12, this technique can be used both with the straight boundary shown in FIG. 4, where the combining out provides the strain reduction. Alternatively or additionally, the technique can be used with any of the non-straight boundaries shown in FIGS. 5 to 11, where the combing out provides further strain reduction in addition to the strain reduction formed by the non-straight edge.

Figure 13:
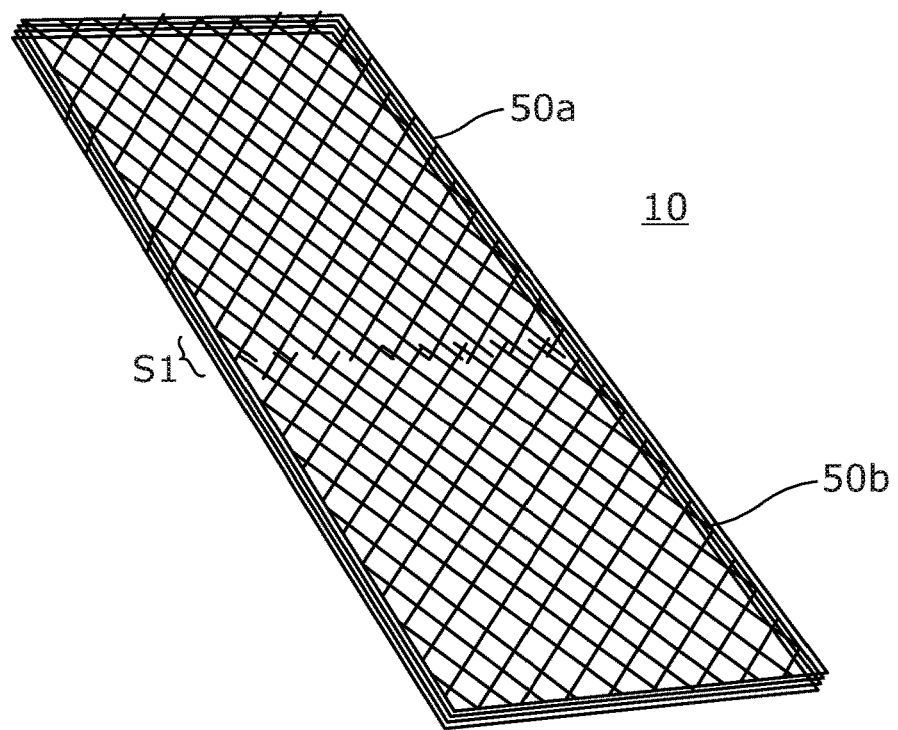
FIGS. 13 and 14 show another example of the arrangement of the fibre ends at an edge of a layer of a composite member.
Figure 14:
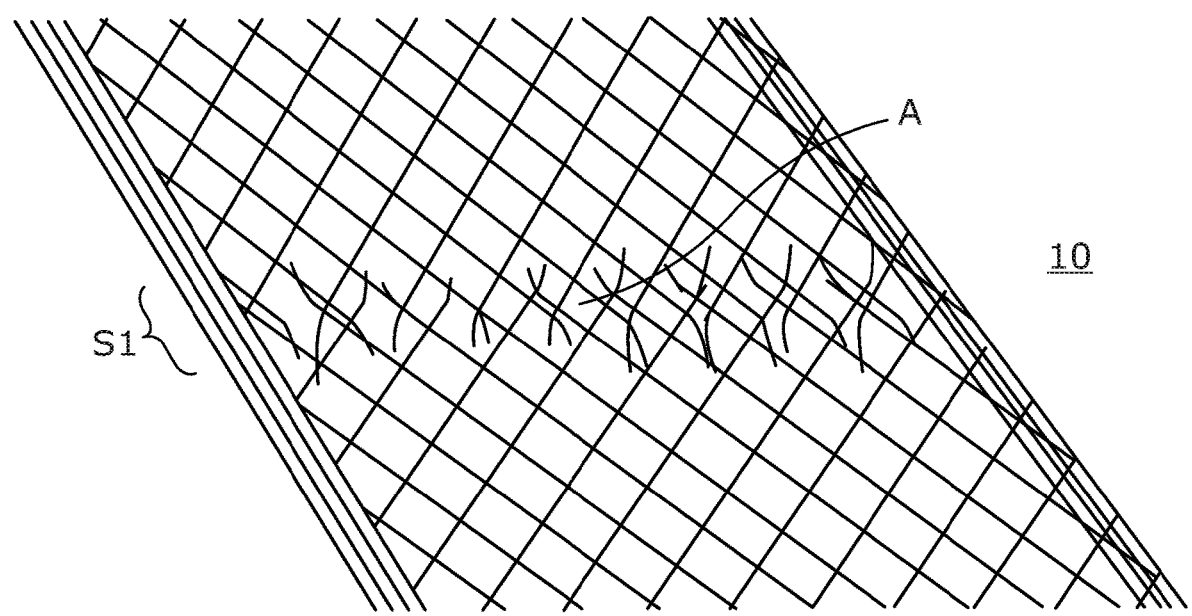

If the aim is to join two materials in a lamina plane, these combed out fibres from the two materials can be commingled, forming a low strain transition. The analogue for a linear/laminar material would be a multiple V or U cut as shown in FIGS. 9 and 10. For example FIG. 13 shows a first woven lamina section 50a joining a second woven lamina section 50b where the ends local to the join are combed out as described above and comingled over the region of the edge 51. The cut ends of one section 50a are laid down as above. The second piece is laid out as above, with an overlap. This is shown in more detail in FIG. 14.

The combing out preferably both de-braids the material and align the fibres with the longitudinal axis 18. This creates a less abrupt transition from one material to the other in the stresses and strains at that point when the member is coiled/extended. The degree of combing out will depend on the arrangement of the fibres in the material, the thickness of the member and the diameter of the extended member. In some examples, the overlap is at least 5% of the diameter of the extended member and/or less than 50% of the diameter of the extended member. In most common applications, it is envisioned that an overlap of between 2 mm to 20 mm will generally provide a suitable overlap between combed out fibres, such that the member does not lose stiffness at the join, without producing a significant local spike in stress/strain.

Taken together, technique described in the application allows a member to be manufactured, where it is possible to:
  Change the rolling load along the length
  Change the secondary diameter—usually the diameter of the coil—along the length
  Change the stiffness along the length
  Change the natural frequency along the length. This is a consequence of the change in stiffness. As there will then be more than one natural frequency along the overall length this can also help damp out any vibration once this occurs.
  All this can be accomplished without causing boundary strains that will damage the member when rolled and unrolled.

Embodiments of the present invention have been described with particular reference to the example illustrated. However, it will be appreciated that variations and modifications may be made to the examples described within the scope of the present invention.

The invention claimed is:

1. A composite member formed as a longitudinal structure capable of being coiled about an axis transverse to the longitudinal axis of the member, the composite member comprising plural fibre reinforced layers of material configured and bonded together to form a laminate, wherein the laminate has a different configuration in a first portion of the member from the configuration of the laminate in a second portion of the member, the first and second portions being at different longitudinal positions along the longitudinal extent of the member, such that the member has different mechanical characteristics along its longitudinal axis.

2. A composite member according to claim 1, where one or more layers comprise a fibre reinforced composite.

3. A composite member according to claim 1, wherein the member is constructed and arranged so as to be bistable.

4. A composite member according to claim 1, wherein the layer boundary comprises a zig-zag shape having plural points or a curved shape having at least one maxima and at least one minima.

5. A composite member according to claim 1, wherein the different configuration is provided at least in part by the fibres in a first layer of material in the first portion of the member being more angled with respect to the longitudinal axis of the structure than the fibres in the first layer of material in the second portion of the member, the first and second portions of the first layer being within the same laminar plane and contiguous in a longitudinal direction.

6. A composite member according to claim 1, wherein coiling is initiated at a first end of the member, the different configuration providing additional bending stiffness to the member so as to increase the natural diameter of the coil.

7. A composite member according to claim 1, wherein the member forms a mast or boom.

8. A composite member according to claim 1, wherein the different configuration is provided at least in part by at least one of said layers of material in the laminate extending has a boundary partway along the longitudinal extent of the member and having a boundary extending between the longitudinal sides of the member which separates the first and second portions of the member.

9. A composite member according to claim 8, wherein the boundary is angled with respect to the transverse axis of the member.

10. A composite member according to claim 9, wherein the layer boundary comprises a V-shape or inverted V-shape.

11. A composite member according to claim 9, wherein the layer boundary comprises a U-shape or inverted U-shape.

12. A composite member according to claim 9, wherein the layer boundary comprises a zig-zag shape having plural points or a curved shape having at least one maxima and at least one minima.

13. A composite member according to claim 8, wherein at least one layer having a boundary is provided at a central longitudinal portion of the member and does not extend to at least one end of the member, the at least one layer providing additional bending stiffness to the member at the central portion but not the at least one end portion so as to require less force to initiate coiling of the member at that end.

14. A composite member according to claim 1, the different configuration of the member achieving different local bending stiffnesses of the member, such that the member has plural natural frequencies along its length to aid in damping vibrations that arise in the member.

15. A composite member according to claim 8, comprising plural layers having respective plural boundaries wherein the boundaries are offset along member so as to create gradual increase in stiffness and/or coil diameter along at least a portion of the member.

16. A composite member according to claim 8, wherein the at least one layer is a braided or woven fibre reinforced layer, wherein the fibres local to the boundary are combed out to align the fibre ends increasingly with the longitudinal axis so as to provide strain relief at the boundary when coiling or extending the member.

17. A composite member according to claim 16, wherein a first layer has a boundary partway long the member and a second layer within the same laminar plane as the first layer and has a boundary that matches the boundary of the first member such that the first and second layers are contiguous in a longitudinal direction, wherein both first and second layers are braided or woven fibre reinforced layers having their longitudinal fibres local to their respective boundaries combed out and intermingled with each other to increase the amount of intermeshing of the fibres in the respective first and second layers at the boundary.

18. A method of manufacturing a composite member according to claim 1, the method comprising:
   stacking the plural layers of material; and
   bonding the layers of material to form a laminate.

19. A method according to claim 18, wherein the at least one layer is a braided or woven fibre reinforced layer, the method comprising, prior to bonding the layers of material, combing out the fibres local to the boundary so as to reduce the amount of intermeshing of the fibres and to align the fibre ends increasingly with the longitudinal axis so as to provide strain relief at the boundary when coiling or extending the member.

20. A method according to claim 19, wherein stacking the plural layers comprises placing a first layer of material having a boundary partway long the member and placing a second layer of material within the same laminar plane as the first layer and has a boundary that matches the boundary of the first member such that the first and second layers are contiguous in a longitudinal direction, wherein both first and second layers are braided or woven fibre reinforced layers and the method further comprises combing out the fibres of the first and second layers local to their respective boundaries and intermingled the combed out fibres with each other.

* * * * *